(12) United States Patent
Burns (10) Patent No.: US 6,546,797 B2
(45) Date of Patent: Apr. 15, 2003

(54) ABSOLUTE POSITION MEASURE WITH MULTI-BEAM OPTICAL ENCODING

(75) Inventor: Alan Alexander Burns, Portola Valley, CA (US)

(73) Assignee: MLHO, Inc., Portola Valley, CA (US)

( * ) Notice: Subject to any disclaimer, the term of this patent is extended or adjusted under 35 U.S.C. 154(b) by 0 days.

(21) Appl. No.: 09/924,638

(22) Filed: Aug. 8, 2001

(65) Prior Publication Data

US 2002/0023490 A1 Feb. 28, 2002

Related U.S. Application Data

(60) Provisional application No. 60/228,018, filed on Aug. 24, 2000.

(51) Int. Cl.[7] ............................ G01F 23/56; G01F 23/30
(52) U.S. Cl. ............................ 73/314; 73/305; 73/290 R
(58) Field of Search ................... 73/290 R, 291, 73/1.03, 437.1, 312, 314, 322, 327.5

(56) References Cited

U.S. PATENT DOCUMENTS

| | | |
|---|---|---|
| 5,359,184 A | 10/1994 | Froehlich et al. |
| 5,426,863 A | 6/1995 | Biggel |
| 5,453,839 A | 9/1995 | Sameulsson |
| 5,483,831 A | 1/1996 | Steiner |
| 5,574,445 A | 11/1996 | Maresca et al. |
| 5,585,786 A | 12/1996 | Clark et al. |
| 5,880,683 A | 3/1999 | Brandestini |
| 5,950,487 A * | 9/1999 | Maresca et al. .............. 73/293 |

\* cited by examiner

Primary Examiner—Daniel S. Larkin
Assistant Examiner—Rodney Frank (57) ABSTRACT

Multi-symbol refractive encoding of distance or level along a scale provides an advanced means for measuring liquid level or dissimilar-liquid interface level with a float. Distance or level information is encoded in the patterns of microfacets impressed in the scale. The microfacets divide and direct incident visible or infrared beams toward or away from detectors disposed in arrays. This approach provides significant reductions in the number of encoding tracks and of the size of the float, improved accuracy, fault detection, increased span, less friction, and easier installation. A slender rod can replace the wide encoding tape of prior designs. The rod can also be used to guide optical or acoustic signals efficiently from floats to the rod support and thus on to level indicating and recording devices. In addition, the rod support provides means for quick installation, signal coupling, and setting reference levels.

15 Claims, 13 Drawing Sheets

ABSOLUTE POSITION MEASURE WITH MULTI-BEAM OPTICAL ENCODING

CROSS-REFERENCES TO RELATED APPLICATIONS

This application is a continuation of Provisional Application No. 60/228,018 filed Aug. 24, 2000.

BACKGROUND

1. Field of invention

This invention relates to measurement of liquid level, specifically to an apparatus employing multi-symbol refractive optical encoding to determine the absolute position of a float on a slender rodlike scale.

2. Background Description of Prior Art

U.S. Pat. No. 5,950,487 Maresca, et al. summarizes the prior state of the art. Maresca et al. describe a multiple-float, liquid-level gauging system that employs a flat, flexible, and wide measurement scale tape. Distance or level information is encoded on numerous parallel tracks as nominally opaque segments in an otherwise transparent scale tape. That is, elements of the scale tape either block or transmit visible or infrared light, or some other energy. Because only on-off binary data may be encoded on the Maresca et al. scale, space utilization on the scale is inefficient, and many tracks are needed to encode distance or level information. For example, 12 such tracks are needed to encode 4096 levels. More tracks and a wider tape are necessary to increase the number of levels. The Maresca et al., scale also requires a relatively large number of emitters and detectors—one each for every scale track or encoded bit. Elaborate methods are described by Maresca et al. to hold the flexible scale in a vertical position, stretch it out, or to anchor it. The wide flat tape used for the Maresca et al. scale also requires special efforts to circumvent the tendency of the tape to stick to the inside of the wide slot in the float. The wide tape also means that the float is similarly large. As is typically the case with such systems, the Maresca et al. on-off encoding system is also subject to inadequate opacity, or light blocking. Pinholes and thin spots allow light to leak through, reducing contrast, and leading to errors. Maresca et al. also describe a three-layer tape scale necessitated by a requirement to print the opaque segments on an inner layer, which must be sandwiched between two other protective layers. A two-layer tape is simpler, easier, and cheaper to construct.

There are numerous examples where light or other energy is either blocked or transmitted to encode absolute distance or level information. Other examples involve various arrangements with freely moving floats and the use of Gray codes. For example, U.S. Pat. No. 5,483,831 Steiner provides an example of a battery-powered float on a vertical guide with optical reflective encoding. The Steiner float is off center from the guide, has a large contact area with a guide, and employs a cable for data transmission, all of which features tend to restrict float motion. Numerous tracks are needed to provide many unique distances or levels. U.S. Pat. No. 5,880,683 Brandestini describes a ternary (base 3) absolute Gray code digital position encoder that uses only a single track. Additional code elements in are inserted longitudinally in the single track. Consequently, resolution is degraded, and the number of positions encoded is limited. U.S. Pat. No. 5,574,445 Maresca et al. describes a multi-cycle interleaved Gray code scale that also provides a reduction of the number of tracks required. This type of encoder also employs binary on-off (transparent and opaque) state detectors. Yet others use transmissive or reflective elements to count relative changes in distance along a scale. U.S. Pat. No. 5,428,863 Biggel and U.S. Pat. No. 5,585,786 Clark et al. provide additional recant examples of this type of encoder.

U.S. Pat. No. 5,453,839 Samuelsson describes use of an optical diffuser to spread a light beam out over a subgrouping of photoelements in order to determine the centroid of the beam, and thus accurately measure its position to sub-beam precision. There is no distance encoding, and a long row of photoelements is needed to span a distance interval. Only short spans are practical.

U.S. Pat. No. 5,359,184 Froehlich et al. describes optical encoding utilizing selectively refracted light. Refractive encoding is used to identify cuvettes employed in automated testing of biological samples. Wedge-shaped beveled facets are molded into flanges on the cuvettes to encode the cuvette identity. Bevels in two opposite orientations selectively refract light onto one or the other of two closely-spaced detectors, whose outputs are compared to recover the binary code bit value. Manual adjustment is provided to account for detector sensitivity variation. Several (six, in the examples given) such facets provide a number (64, in the example) of distinct codes. Other objects besides cuvettes, having suitable places for transparent facets, are also said to be identifiable using this technique. However, the use of uniform single wedges across the facets limits usefulness. Thick facets are necessary to accommodate large wedge angles. Large wedge angles are necessary to produce useful lateral beam deviations over short ranges (Fresnel-lens-like facets with a serrated surfaces would be more effective). Single uniform wedges cannot split an incident beam into multiple beams, and thus increase the number of symbols encoded per facet. There is no arrangement of facets with progressive or sequential encoding of symbols with distance, which is necessary to form a measurement scale.

SUMMARY

In accordance with the present invention a liquid level sensor comprises an autonomous float on the surface with an internal optical reader to decode distance or level information encoded in the dispositions of microrefractive facets on a slender vertical rod. The rod also conducts decoded level information to the rod support. An optical reader in the rod support provides a reference level.

OBJECTS AND ADVANTAGES

Accordingly, the overall object of this invention is to provide an advanced method and apparatus for measuring liquid level. Specific objectives and advantages of this invention include reducing the number of encoding tracks and electronic components and the size, weight, and width of floats and of the level-encoding scale.

Another objective and advantage of this invention is to provide multi-symbol encoding per encoded level.

Another objective and advantage of this invention is to increase the number of encoded levels.

Other objectives and advantages of this invention are to reduce the possibility of measurement errors and to provide fault detection.

Another advantage of this invention is the use of an encoding rod scale that permits the decoder light beams to share space in the encoding scale.

Yet another objective and advantage of this invention is to employ the encoding scale as a signal conduit and to provide means for coupling signals into and out of the scale.

Another objective and advantage of this invention is to increase battery life by reducing power requirements.

A further objective and advantage of this invention is to simplify installation.

Yet another objective and advantage of this invention is to provide a reference level.

Still further objects and advantages will become apparent from a consideration of the ensuing description and accompanying drawings.

REFERENCE NUMERALS IN DRAWINGS

| | |
|---|---|
| 1 liquid-level sensor system | 10 rod support |
| 10C rod support | 12 encoding rod |
| 14 first liquid surface | 16 support arms |
| 18 main float | 18B main float |
| 20 auxiliary float | 22 second liquid interface |
| 24 main rod member | 26 encoding rod cover |
| 28 encoder facet | 28B encoder facet |
| 30 encoder track | 30B encoder track |
| 32 refractlve gaps | 32B refractive gaps |
| 34 guide slots | 36 enooding rod core |
| 38 microfacets | 38B microfacets |
| 40 incident light beam | 42 photodetector element |
| 44 photodetector array | 44B photodetector array |
| 44C photcdetector array | 46 battery pack |
| 48 light source | 48B light source |
| 48C light source | 50 guide rod |
| 50A guide rod | 50B guide rod |
| 52 inner wall | 52B Inner wall |
| 54 outer surface | 56 end cap |
| 58 window | 58B window |
| 58C window | 60 fiexible printed circuit board |
| 62 microcontroller | 62A microcontroller |
| 64 electronic components | 66 optical transmitter |
| 68 acoustic transmitter | 70 optical receiver |
| 72 acoustic receiver | 74 cover plate |
| 76 transparent O-rlng | 78 cover screws |
| 80 reflective surface | 82 void apace |
| 84 leads | 88 analog combiner |
| 90 anolog-to-digital converter | 92 displey device |
| 94 tranaceiver | 96 communications device |
| 98 encoding ribbon | 100 cover ribbon |

-continued

| | |
|---|---|
| 102 adhesive layer | 104 tape scale |
| 106 elongated slot | 108 data transmitter |
| 110 spacer windows | 112 reader section |
| 114 encoding rod support | |

DESCRIPTION—PREFERRED EMBODIMENT

Figure 1:
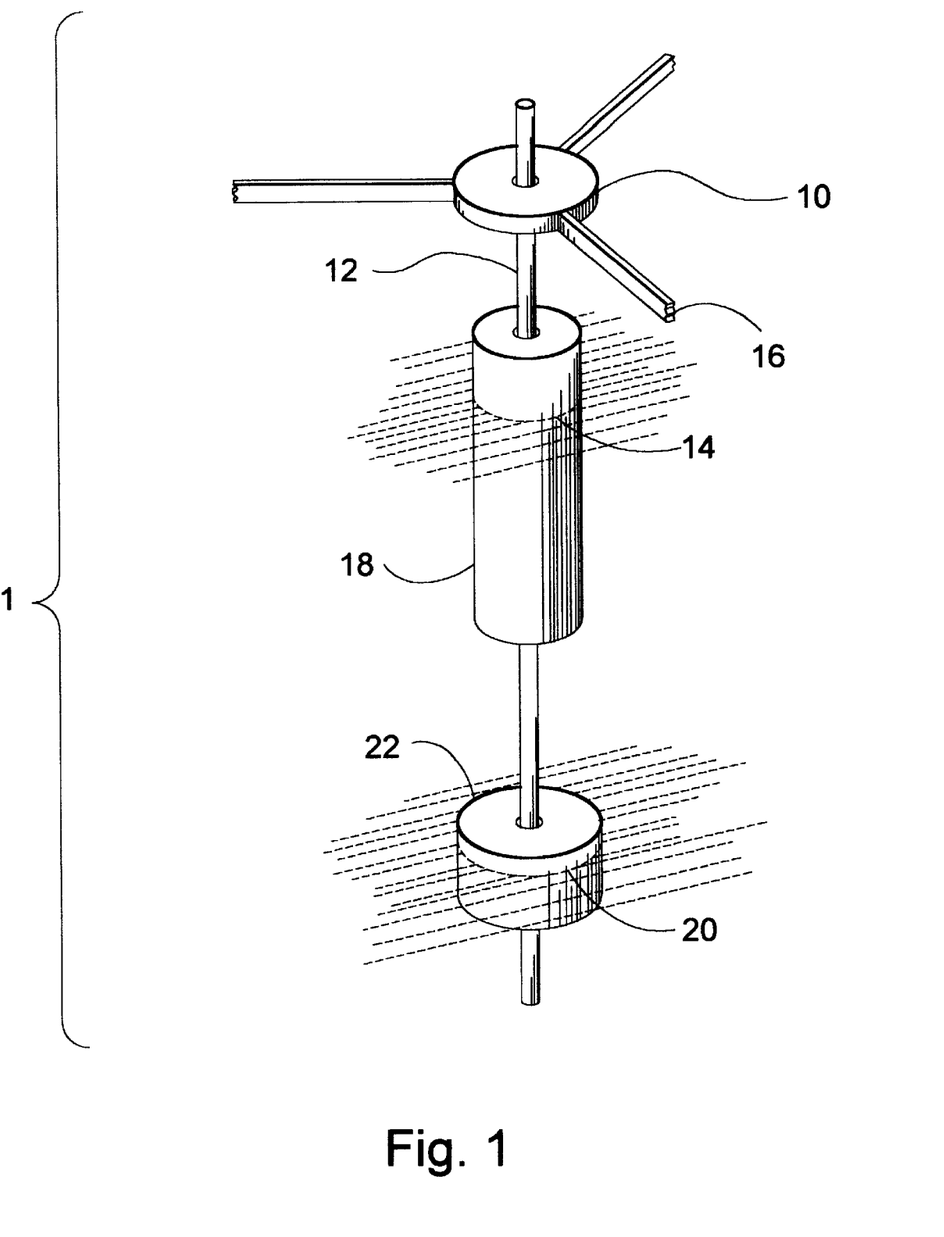
FIG. 1 is an overall perspective view of my invention.

FIG. 1 depicts a preferred embodiment of a liquid level sensor 1. A rod support 10 grips an encoding rod 12 above a first liquid surface 14 so that the encoding rod penetrates the liquid substantially vertically to a desired depth of measurement. Support arms 18 attach the rod support 10 to an external structure (not shown). There are wide variety of possible external structures, which are not part of the present invention. A main float 18 rides partially submerged in the first liquid surface An auxiliary float 20 rides at the interface between the first liquid surface 14 and a second liquid interface 22. Depending on the situation or application, either the main float 18 or the auxiliary float 20 may be deleted. The main float 18 and the auxiliary float 20 may be employed together, for simultaneously measuring the level of a petroleum product in a storage tank and the level of any water accumulation at the bottom of a tank. Only the main float 18 would be needed for measuring water levels in wells, tanks, streams, reservoirs, and the like. The encoding rod 12 passes substantially vertically through the centers of the main and auxiliary floats. Encoding rod 12 simultaneously serves to provide a scale that can be read by an arrangement of visible or infrared light sources and detectors in floats 18 or 20 and to convey optical or acoustic signals containing the results of those readings from the floats to rod support 10. Batteries within floats 18 and 20 supply operating power. As described below, a similar source-detector arrangement can be used in the rod support to provide a reference reading. The encoding rod may be relatively stiff or relatively flexible, depending on the requirements of the application.

Figure 2:
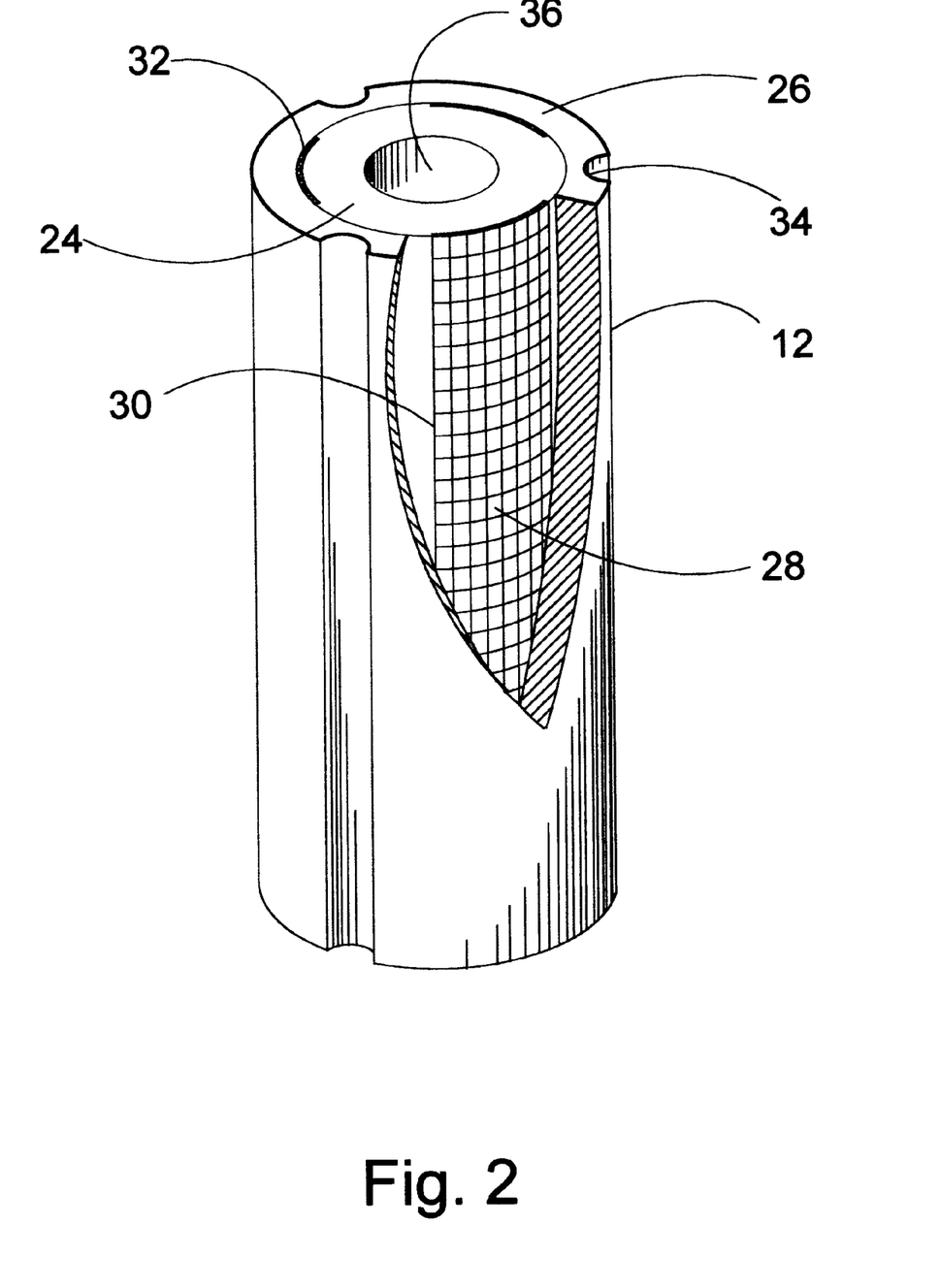
FIG. 2 is a cut-away perspective view of an encoding rod.

FIG. 2 shows details of the encoding rod 12. The encoding rod has two primary elements, a main rod member 24, and a rod cover 26. Both the main rod member and the rod cover are substantially transparent to visible or infrared light, which is used to read distance encoded in rod 12. Distance along rod 12 is encoded within an encoder facet 28 arranged sequentially with other such encoder facets along an encoder track 30. Multiple encoder tracks 30 are arranged circumferentially around the main rod member 24. Multiple tracks increase me number of distinctly encoded distance or level values. Three such tracks are depicted in FIG. 2. Level or distance resolution is equal to the spacing between the encoder facets 28. Rod cover 28 serves to protect the encoder facets 28 and to provide space for refractive gaps 32 (described below). The outer surface of cover 26 also has guide slot. 34. For reasons to be described below, guide slots 34 are depicted as being diametrically opposite rod tracks 30. While preferable, this arrangement is not a requirement. FIG. 2 also shows an encoding rod core 36, which is comprised of material with low sound propagation velocity, such as being air-filled. Besides lightening and allowing for increased flexibility of the encoding rod 12, rod core 36 can channel acoustic signals through and along encoding rod 12. Rod core 36 is an optional element. Visible and infrared signals will be guided by main encoder member 24, whether or not rod core 36 is present.

Figure 3A:
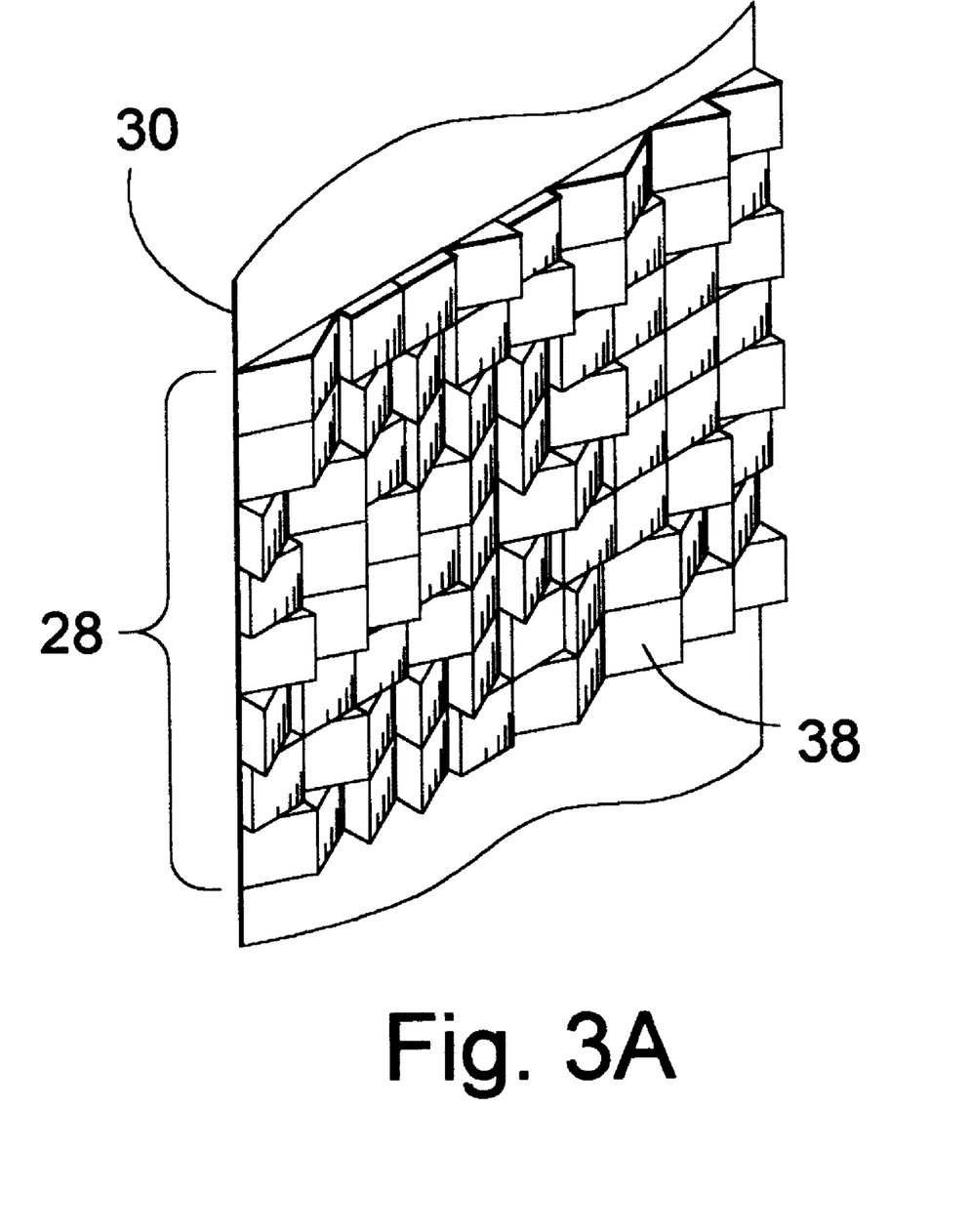
FIG. 3A shows an encoding facet with microfacets.

FIG. 3A shows details of an encoder facet 28. An encoder facet 28 is itself comprised of a plurality of microfacets 38.

Figure 3B:
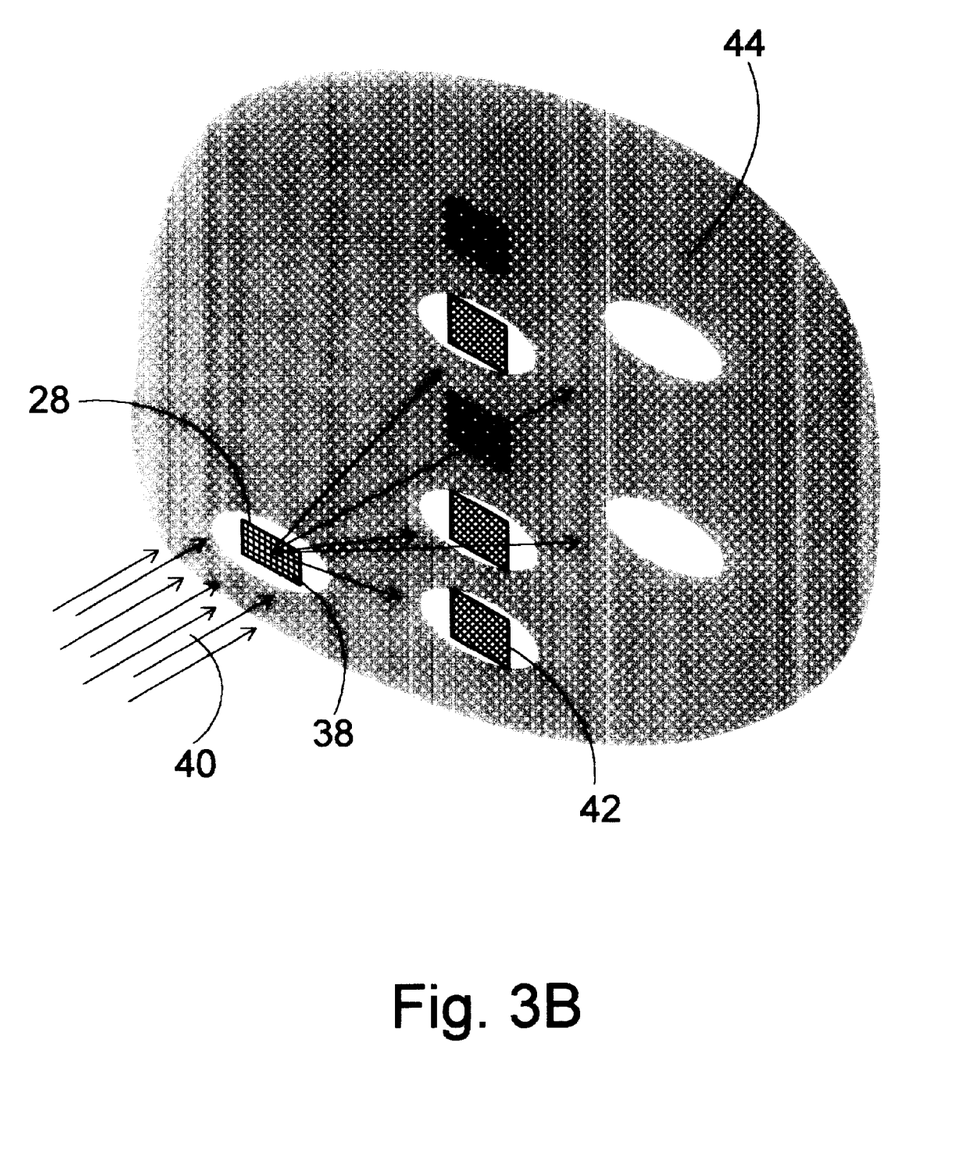
FIG. 3B shows an incident light beam split by an encoder facet to selectively illuminate elements of a photodetector array.

As shown in FIG. 3B, microfacets 38 are arranged to divide an incident visible or infrared light beam 40. The incident light beam 40 is split up by the microfacets 38 in each encoding facet 28 so that the divided parts of the incident beam either strike or miss individual photodetector elements 42 of a photodetector array 44. Thus the particular pattern of microfacets 38 in each encoding facet 28 can produce a distinct on-off pattern of photodetector outputs. Each of these distinctive patterns is a numerical symbol, which can represent a distance or liquid level, in a base-N number system. For example, FIG. 3B depicts a 5-element photodetector array. With five photodetectors, there are $(2^5-1)=31$ available symbols per encoding facet (preferably, the symbol "00000" is reserved for fault detection and, hence, is unavailable for distance or level measurement). This is the basis for an N=31 base number system. These symbols can be written in the form of binary numbers, "00001", "00010", and so on, to "11111". So, if there are three tracks, each with 31 symbols available, $31^3=29,791$ unique distances or level values can be encoded. Note that only three light sources and 15 detector elements are needed, whereas 30 total are necessary using conventional opaque/clear encoding to achieve a similar number of values. It can be appreciated that increasing the number of symbols per encoder facet and/or the number of encoder tracks will increase the span of distances or levels covered. Furthermore, in some applications, a smaller number may be adequate. For example, a two-track, four-detector per track system will have 225 resolvable levels.

A unit-distance or "Gray" code is used to encode distance along the encoding rod 12. That is, the order of symbols representing sequential distances or levels is chosen so that only one bit in all of the symbols across encoder tracks 30 will change between adjacent distances or levels.

Symbol "00000" represents no light detected by any photodetector element 42 of an array 44. If symbol "000000" is not used as a distance or level-encoding symbol, it can be employed as a detector of faults such as insufficient or no light from the source or beam blockage by dirt or other contaminants.

Figure 3C:
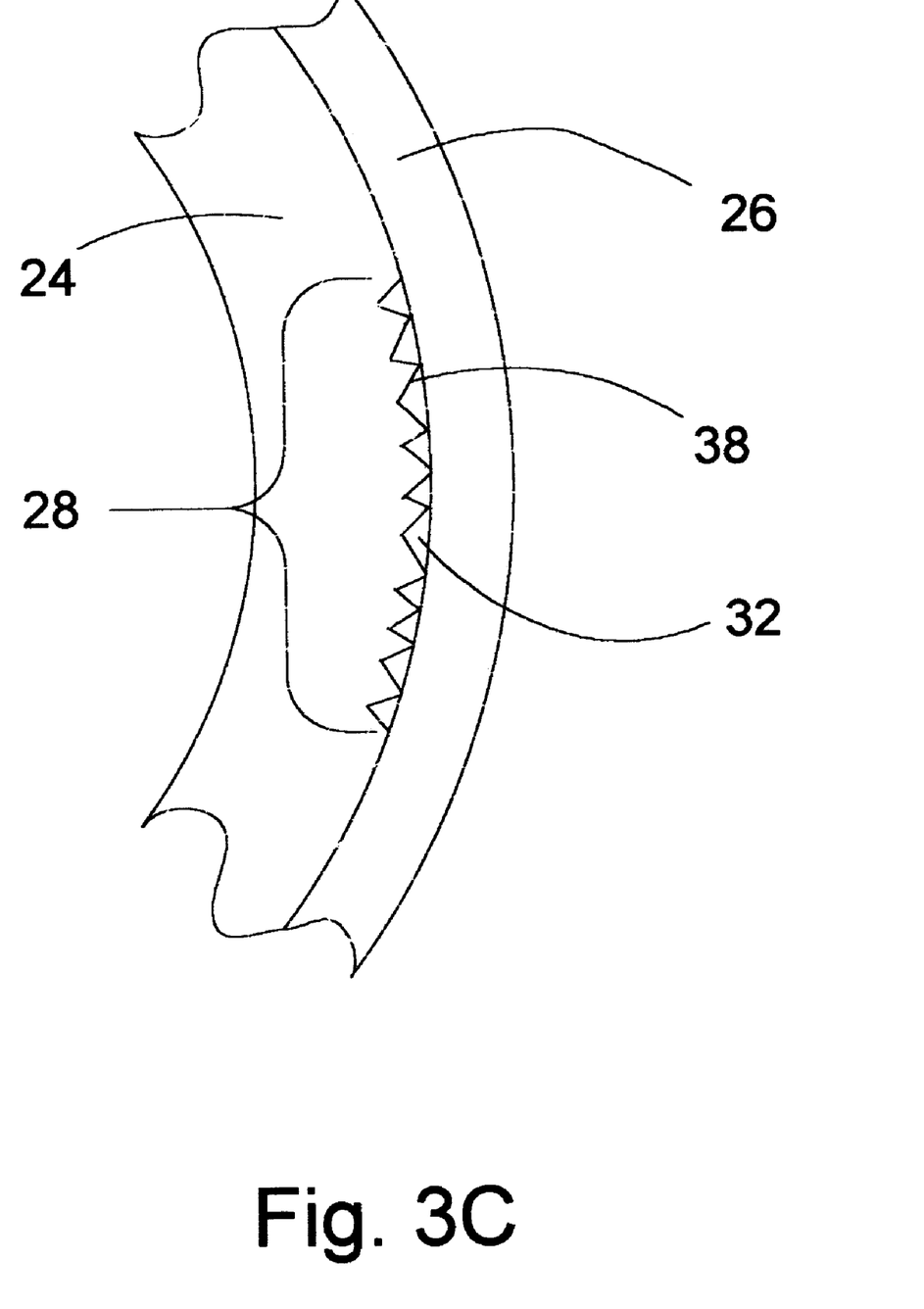
FIG. 3C is a cross-sectional view of an encoding rod showing an encoder facet, microfacets, and refractive gaps.

FIG. 3C shows some cross-sectional details of an encoding rod 12. Microfacets 38 are embossed, engraved, etched, or otherwise impressed into the surface of main rod member 24. Rod cover 26 is preferably heat-shrunk or otherwise bonded over main rod member 24, leaving small refractive gaps 32 between the main rod member 24 and the rod cover 26. Refractive gaps 32 are preferably air- or gas-filled, although any filler material having a sufficiently different visible or infrared refractive index from that of the main rod member 24 is acceptable. It is important that air-or gas-filled gaps be hermetically sealed. Besides splitting and deflecting the incident beam, the microfacets 38 can also focus either the split or the incident beams, as would be readily apparent to anyone skilled in the art. In the example of FIG. 3B, each one-fifth part of all microfacets is "assigned" to a particular one of the five photodetectors. Each portion of the microfacets that are assigned to a particular photodetector may either refract part of the incident light beam 40 onto that photodetector or refract that part of the light beam in another direction so that it does not fall on any photodetector. When selected, each photodetector in this example can receive approximately one-fifth of the light of the incident beam 40. While "dumping" light from non-selected photodetectors is not a requirement, it is preferable in order to minimize the possibility of cross talk due to leakage of light onto non-selected photodetectors. Although the photodetectors are shown arranged as a vertical array, this is not a requirement.

Preferably, to avoid regular diffraction grating effects, the particular microfacets 38 that are assigned to each specific photodetector are randomly disposed over each encoder facet 28.

Figure 4A:
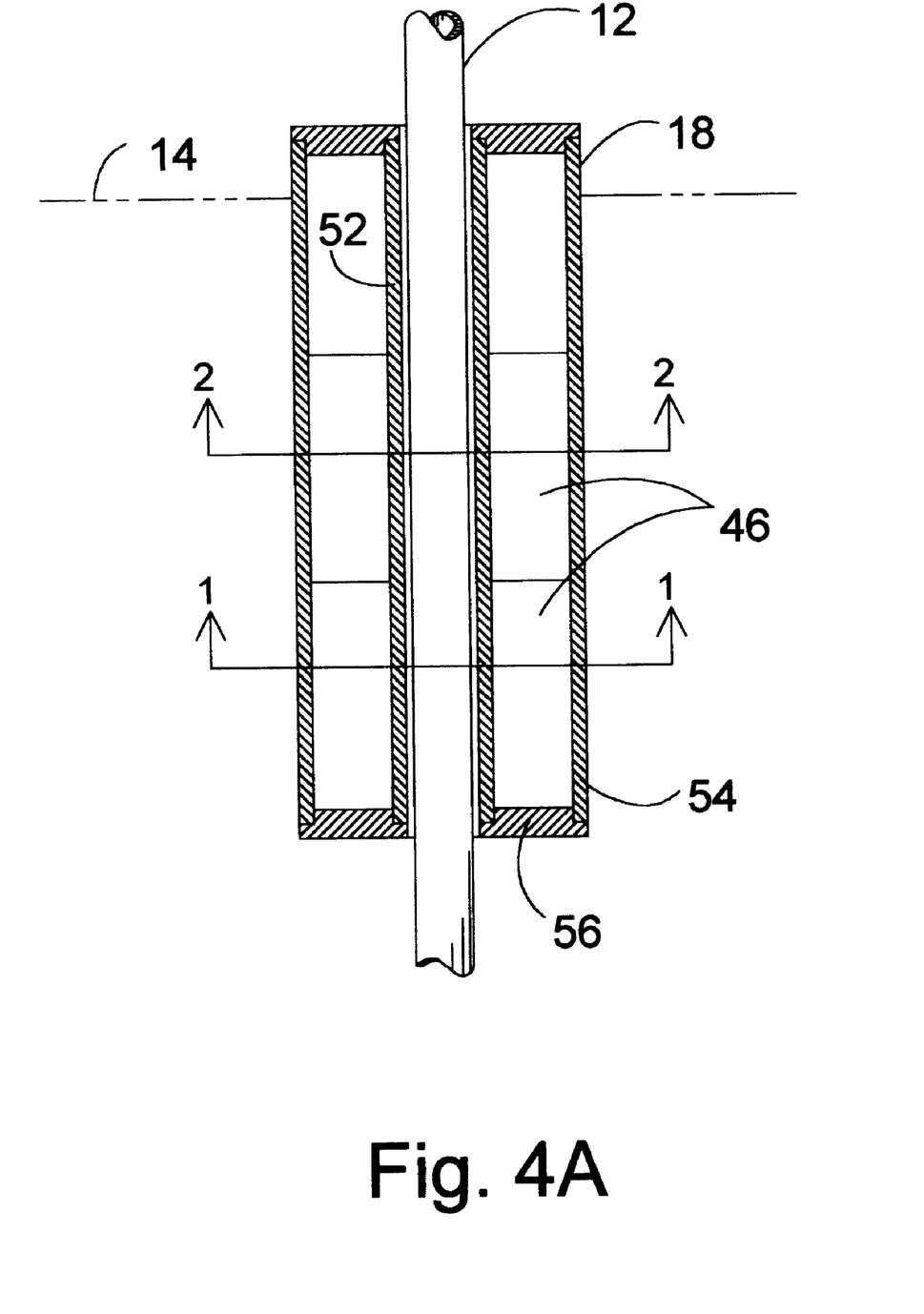
FIG. 4A shows an elevation cross section of a float.

FIG. 4A show; a vertical section through a main float 18. For hydrodynamic stability, the center of flotation should be well above the center of mass, so the electronic components and, especially, heavy items such as battery pack 46 need to be arranged to be as low as possible in the float. A high degree of hydrodynamic stability insures that floats ride substantially vertically and thus minimizes side loads and friction between the float and encoding rod.

Figure 4B:
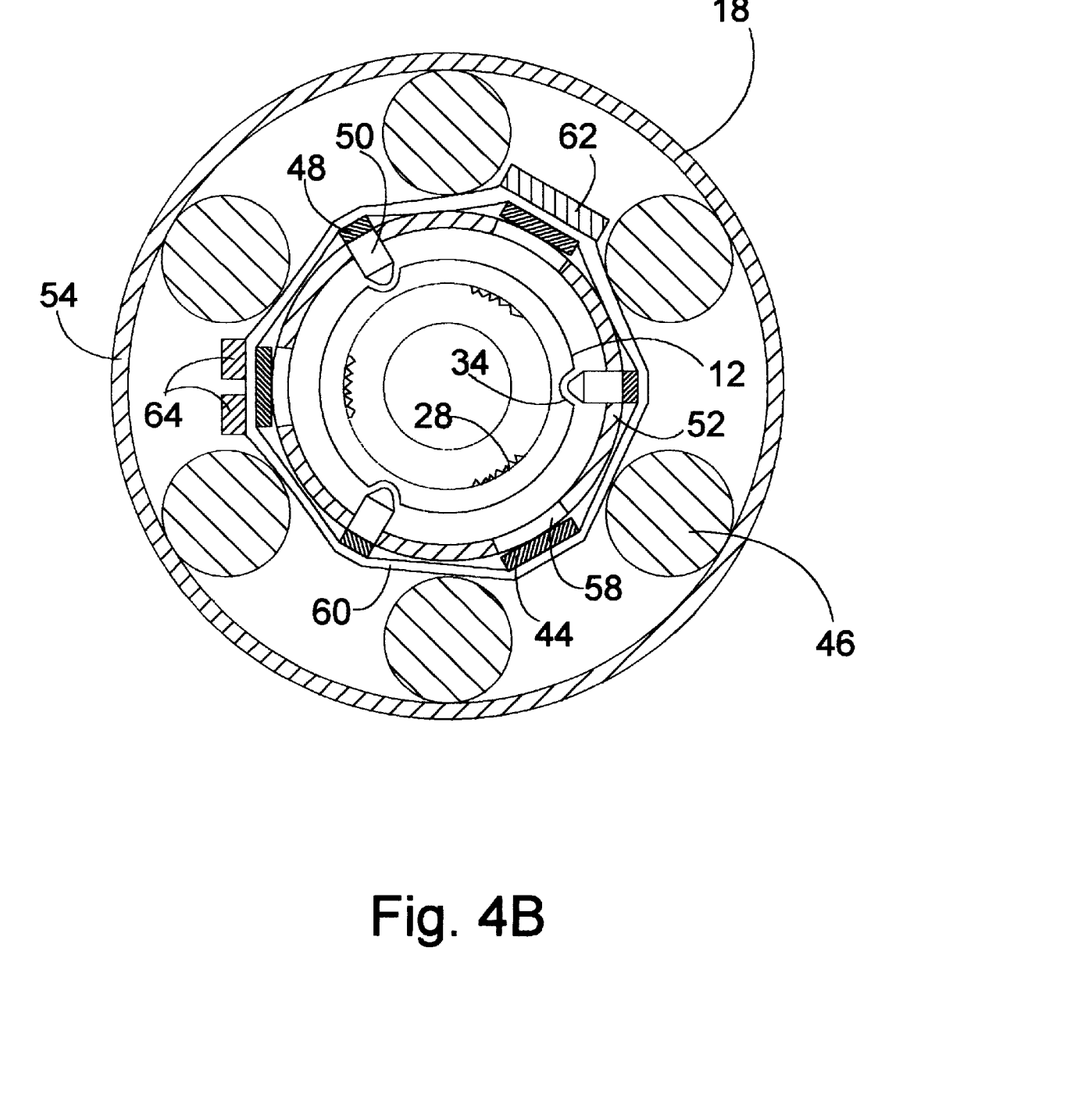
FIG. 4B is a cross sectional view of the portion indicated by section lines 1—1 in FIG. 4A.
Figure 4C:
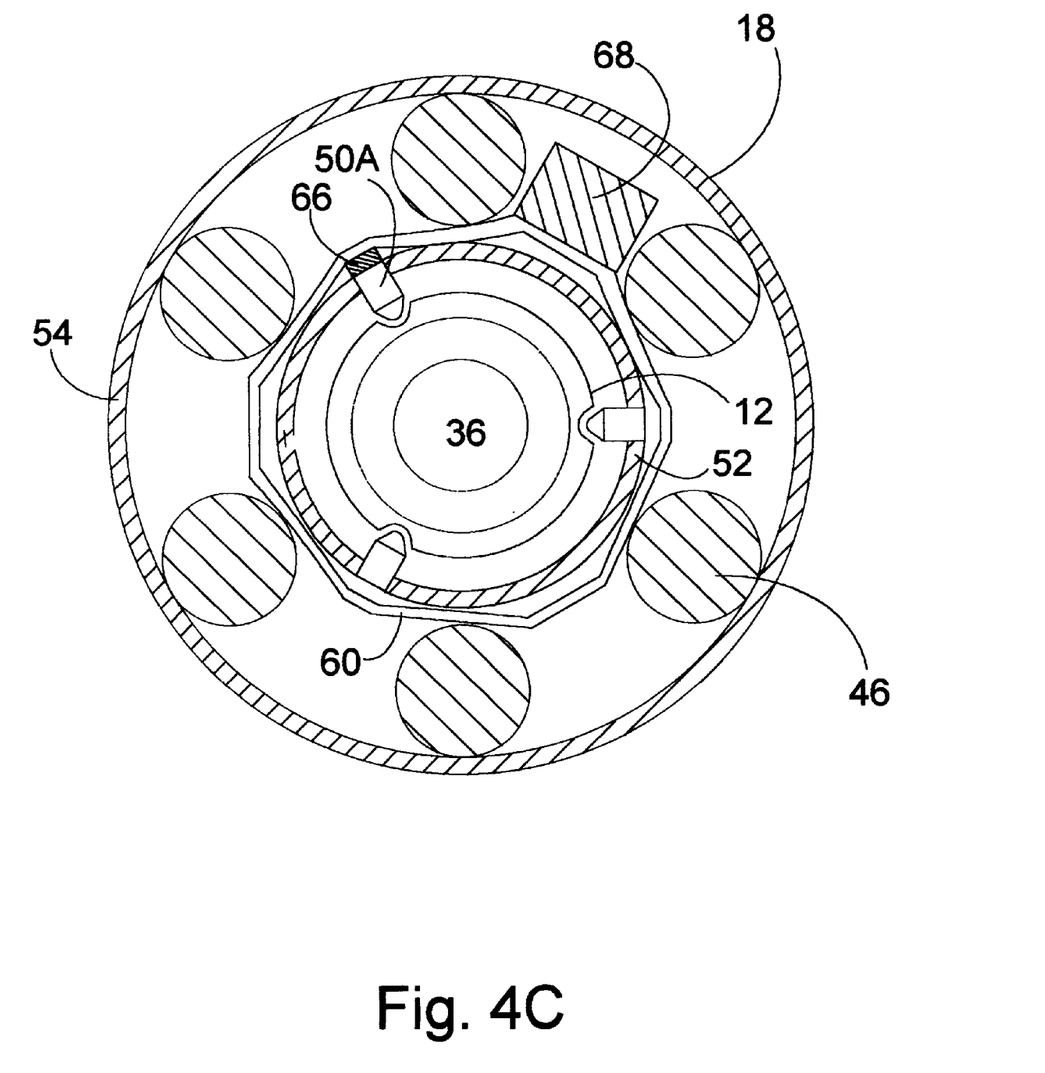
FIG. 4C is a cross sectional view of the portion indicated by section lines 2—2 in FIG. 4A.

FIGS. 4B and 4C are cross-sectional views through float 18. FIGS. 4B and 4C are cross-sectional views indicated by lines 1—1 and 2—2 respectively in FIG. 4A through main float 18. Main float 18 has an outer surface 54 and an opaque inner wall 62, and is sealed by an end cap 56 at each end. Auxiliary float 20 has essentially the same internal arrangement as main float 18, and has cross sections virtually identical to those shown in FIGS. 4B and 4C.

Cross,section 1—1 in FIG. 4B shows details of a visible or infrared light source 48, encoder facet 28, and photodetector array 44. A transparent guide rod 50 protruding through opaque inner wall 52 collimates or focuses light from light source 48 onto encoder facet 28. Guide rods 50 also lightly engage guide clots 34 to align main float 18 with encoding rod 12. Although encoder facet 28 is shown opposite guide rod 50 in encoding rod 12, it could be proximal to guide rod 50. A window 58 permits light refracted by encoding facet 28 to strike photodetector array 44. Preferably, to minimize weight, light sources 48 and photodetector arrays 44 are attached to a flexible printed circuit board 80 that wraps around inner wall 52. Flexible board 60 also supports a microcontroller 82 and other electronic components 84, and provides connections to battery pack 46. Microcontroller 82 and components 64 convert the outputs of photodetector arrays 44 into positional or level information or into signals that contain level data. Guide rods 60 are tapered at the end proximal to a guide slot 34 to minimize contact area with guide slots 34. The distal end of a guide rod nearest a light source 48 may have a curved lens surface to focus and/or collimate the emergent light into incident beam 40. Guide rods 50 are preferably mounted below the liquid level for lubrication. Because the refractive indexes of typical liquids are similar to those of optical materials comprising guide rods 50 and encoding rod cover 26, there will be minimal refraction at the interfaces between a guide rod or at the encoding rod cover and the liquid. Any such refraction and any additional refraction through other interfaces can be compensated for by the distal optical surface of the guide rod and/or encoding facets. Either or both surfaces of window 58 may employ built-in lenses to control the properties of beam 40, Cross-section 2—2 in FIG. 4C shows the disposition of a visible- or infrared-light optical transmitter 88 and of a (preferably ultrasonic) acoustic transmitter 68. Either the optical transmitter or the acoustic transmitter may be used to transmit distance or level data from the float. Optional guide rods 50A again lightly engage guide slots 34 and prevent contact between float inner wall 52 and the encoding rod 12. Close contact between the float wall and the rod should be avoided because capillary attraction may cause the float to move in a jerky manner when the liquid level changes. Guide rod 50A is designed to maximize visible or infrared energy coupling from the optical transmitter into the encoding rod and should be near the first liquid surface 14. Above that surface, the large difference between the refractive index of the encoding rod material and air insures that the encoding rod acts as a relatively efficient light pipe. Distance or level data signals from the acoustic transmitter 88 travel through inner wall 52, the liquid, and the encoding rod cover 26 and main member 24 into the encoding rod core 36. Once trapped in the rod core 36, acoustic signals may propagate with relatively little attenuation compared to free transmission through liquid or air.

Figure 5:
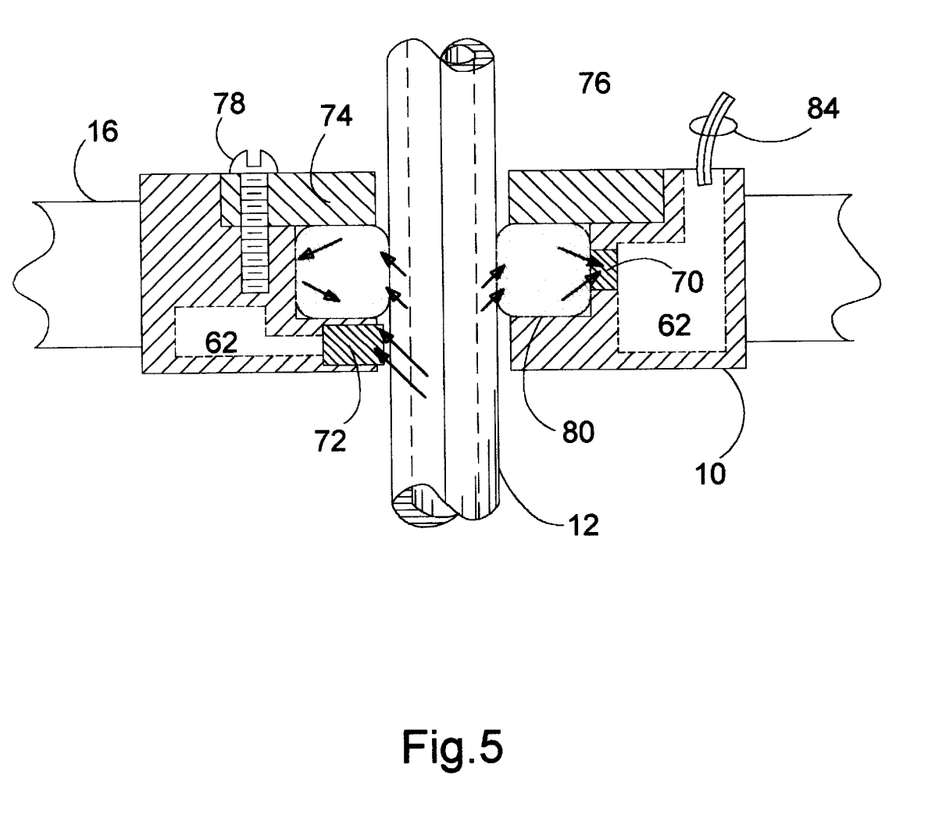
FIG. 5 shows a cross section of an encoding rod support.

FIG. 5 shows a cross section of a rod support 10 with an optical receiver 70 and an acoustic receiver 72. Support arms 10 hold the rod support in place. A cover plate 74 compresses a transparent O-ring 76 against encoding rod 12 so that the encoding rod is gripped firmly. An arrangement using cover screws 78, or a variety of quick-locking mechanisms (not shown), provides the compressive force. A quick-locking mechanism allows for easy setting or adjustment (during installation, in particular) of the vertical position of the encoding rod 12. Transparent O-ring 76 also serves to efficiently couple optical signals out of the encoding rod 12. A reasonably close match between the refractive indexes of the encoding rod cover 26 and the transparent O-ring 76 minimizes reflections at their contact surface so that optical signal energy readily enters the transparent O-ring. A reflective surface 80 lining the interior of the O-ring slot (except at the optical receiver 70) acts as an "integrating sphere" that multiply reflects the optical signal energy until it enters the receiver 70 or is essentially dissipated. Acoustic receiver 72 is set up to sense acoustic signals leaking out of the encoding rod core 36. Standard required electronic components needed to process, retransmit, and/or display received level data are installed in void space 62. Leads 84 provide electrical signal and power connections.

Figure 6:
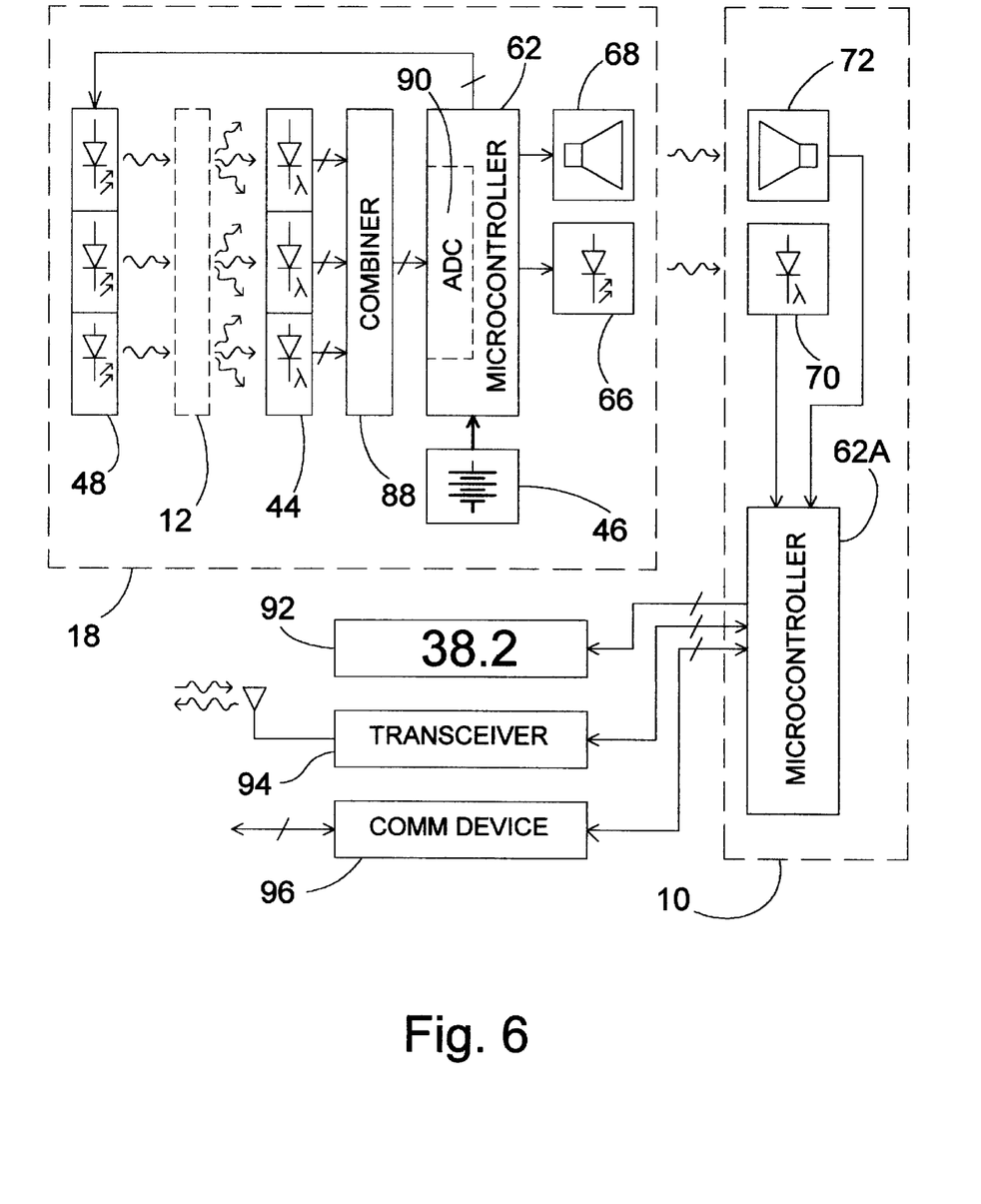
FIG. 6 is a block diagram of the basic float and rod support electronics and functions.

FIG. 6 shows a block diagram that describes the basic electronic elements and operation of a main float 18 and rod support 10. Preferably, a single microcontroller 62 controls or performs all active electronic functions within the main float. These include driving a visible or infrared light sources 48 and sensing the photodetector array 44 output. The photodetector outputs are fed through an analog combiner 88 into a multiple input analog-to-digital converter (ADC) 90 built into microcontroller 62. Analog combiner 88 reduces the required number of independent ADC channels by multiplexing photodetector elements 42. Visible or infrared light from sources 48 passes through refractive encoding rod 12 to photodetector array 44. Microcontroller 62 can directly drive optical transmitter 86 and/or acoustic transmitter 68. A battery pack 46 powers the main float 18. Rod support 10 contains another microcontroller 62A, that processes signals sensed by acoustic receiver 72 and/or optical receiver 70. Connections to and from microcontroller 62A drive a local display device 92, or communicate with a wireless transceiver 94 or with another two-way communications device 96 to external devices (not shown). Communications device 96 may employ fiber-optic links. Such devices are well known and readily apparent to those skilled in the art.

Alternative Embodiment—Ribbon Tape Scale

Figure 7A:
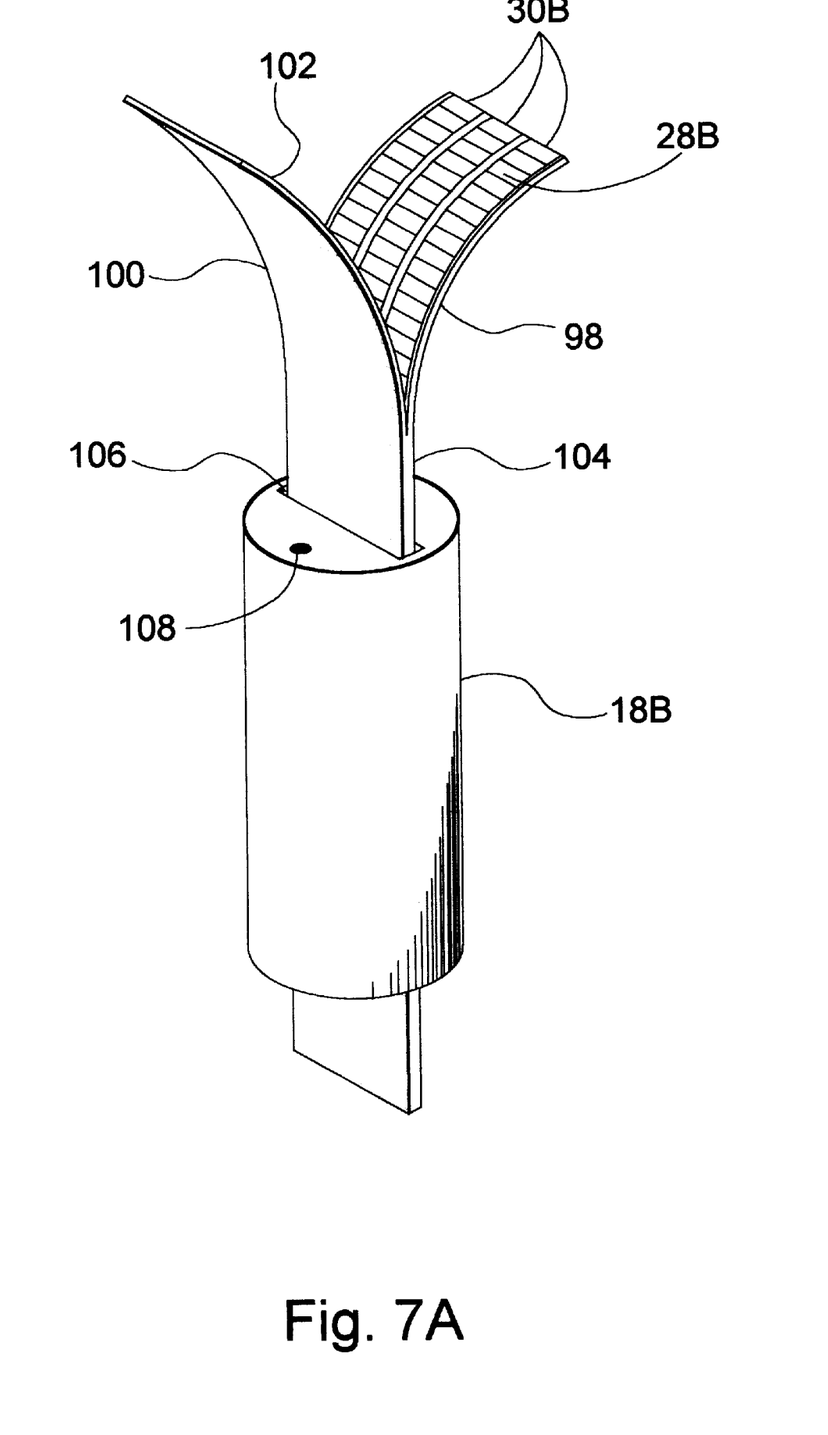
FIG. 7A is a perspective view: of an alternative embodiment employing an encoding ribbon tape.
Figure 7B:
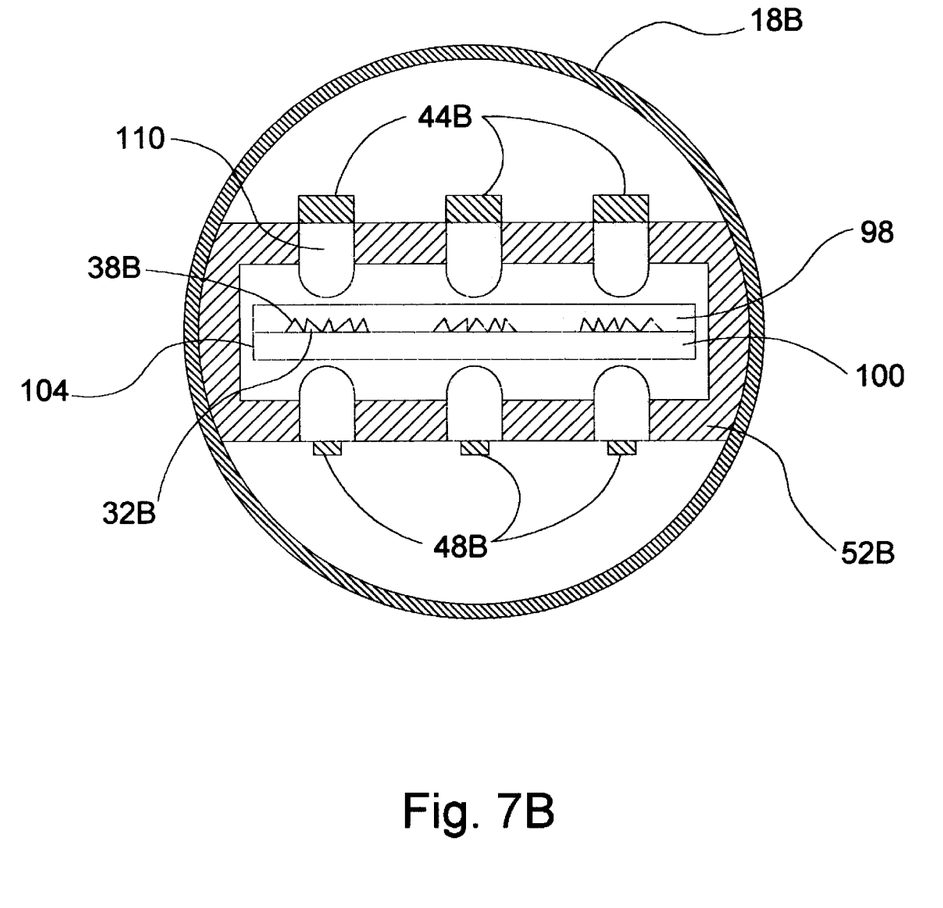
FIG. 7B is a cross section of a float that uses an encoding tape.

FIGS. 7A and 7B show an alternative embodiment employing a transparent encoding ribbon tape scale 104. In this embodiment, encoder microfacets 38B are embossed, etched, machined, or otherwise impressed into one surface of an encoding ribbon 98. A grouping of microfacets 38B comprise an encoder facet 28B. Encoder facets 28B may be arranged into a plurality of encoder tracks 30B. For clarity, tracks 30B are shown well spaced, but they may be laid in close proximity to one another. A cover ribbon 100 may be bonded to encoding ribbon 98 with an adhesive layer 102 to comprise ribbon scale 104. Cover ribbon 100 serves to protect the microfacets and to form refractive gaps 32B above the microfacets 38B. A main float 18B has an elongated slot 106 passing axially through its center. An optical or acoustic data transmitter 108 sends distance or level data to a conventional external receiver unit (not shown). Encoding ribbon tape scale 104 is mounted and supported by conventional means known to those skilled in the art.

FIG. 7B shows a cross sectional view of main float 18B. Here, an inner wall 52B has a rectangular shape. A series of spacer windows 110 focus or collimate visible or infrared light from light sources 488 through transparent encoding ribbon tape scale 104 onto photodetector arrays 44B. Spacer windows 110 also serve to prevent close contact between inner wall 52B and ribbon tape 104. Lateral alignment is maintained by contact between the edge of ribbon tape 104 and the narrow ends of inner wall 52B.

Additional Embodiment—Decoding Rod Support

Figure 8:
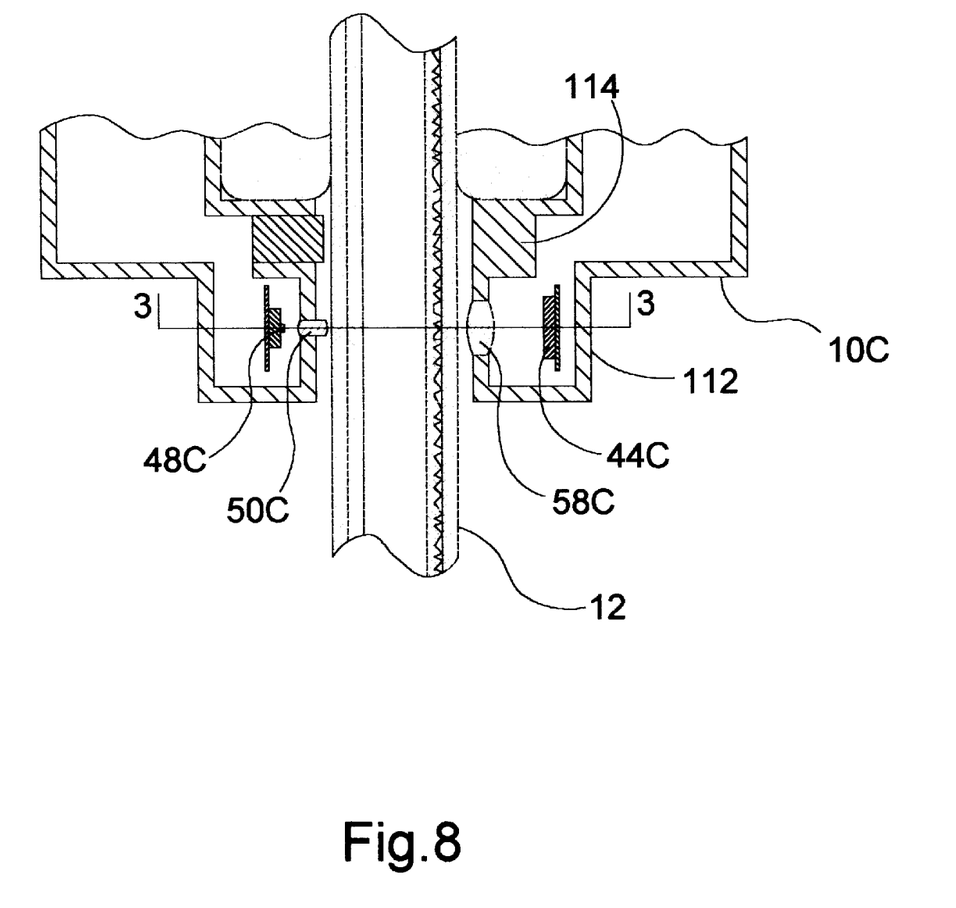
FIG. 8 is a partially cut-away cross section of a rod support with read capability.

FIG. 8 shows a partial vertical cross section of a decoding rod support 114. Decoding rod support 114 is comprised of rod support 10C with an attached code reader section 112. Code reader section 112 contains light sources 48C, guide rods 50C, windows 58C, and photodetector arrays 44C. A flexible printed circuit board may support the electro-optical components and other electronic components (not shown). Microcontroller 62A is already present and can perform the necessary digital processing required by the code reader section 112. The cross section indicated by line 3—3 is essentially the same as that depicted in FIG. 4B, except for the (unneeded) battery pack. Encoding rod support 114 provides a reference distance or level. Having a readily available reference distance or level is particularly useful when the level-sensing system 1 is moved and reinstalled often.

Operation

Operation of the preferred embodiment described in FIGS. 1 through 6 is simple and straightforward. Microcontroller 62 periodically, sequentially, and briefly activates light sources 48 for each encoding track and digitizes the outputs from the corresponding photodetector arrays 44. The digitized photodetector outputs are compared to thresholds internally stored in microcontroller 62 to retrieve the distance or level symbols encoded on rod 12. These thresholds depend on the power outputs of sources 48 and the sensitivities of individual photodetectors elements 42, which vary from unit to unit and are unique to every combination. Thresholds may be set during a calibration step during float manufacture. They may also be varied adaptively during operation to account for aging and changes in optical transmission properties of encoding rods. Histograms of every photodetector output will normally exhibit a bimodal characteristic. Histograms can be maintained in the microcontroller memory to detect shifts and adjust thresholds, as well as detect and report faults. The microcontroller interprets the retrieved symbols as distance or level values and temporarily stores them for (possible) transmission to rod support 10.

In the preferred embodiment, floats operate autonomously, without command from external elements. The frequencies of measurement and data transmission depend on the desired sampling rate and comprise the major factor in determining battery life. The measurement and the data transmission processes consume most of the battery power. Typical microcontroller may be placed a in power-saving "sleep" mode of varying duration, and make measurements when they "wake up". The measurement frequency may be made adaptable, speeding up when levels are changing rapidly and slowing when the situation is static. Battery power may be conserved if a complete data transmission only occurs when a change from the previous liquid level occurs.

Microprocessor 62 also formats the distance or level measurement values into a form suitable for transmission and drives the optical transmitter 66 or the acoustic transmitter 68. A standard asynchronous communications protocol is preferred. Several words would be required typical to transmit the data. Besides distance or level data, housekeeping data, such as battery state, can be added to the transmission, possibly as additional words. Other physical data from additional sensors in the float, such as liquid temperature, pH, conductivity, turbidity, sugar density, etc., can also be added to the transmission.

If two floats are active on an encoding rod, there is the possibility of data collisions, even if one employs optical means and the other uses acoustic data transmission means. Data collisions will occur if main float 18 and auxiliary float 20 attempt to transmit data at the same time. Collisions may be avoided by using the photodetector elements 42 as optical receivers, optical transmitter 66 as an optical receiver (light-emitting diodes are also photosensitive), or acoustic transmitter 68 an acoustic receiver, to determine before a planned transmission if there are other signals already present in encoding rod 12.

Optical and acoustic receivers 70 and 68 in rod support 10 and connected to microcontroller 82A process the float signals. Processing may include immediate relaying, storage, scaling, conversion, retransmission, or driving a local display. These are conventional steps readily apparent to those skilled in the art.

Referring to FIGS. 7A and B, in an alternative embodiment main float 18B rides up and down encoding tape 104 and reads distance or level information encoded in the facets 28B on encoding ribbon 98. Light from sources 48B is divided according to the distance or level symbol present on facets 28B by refractive microfacets and sensed by photodetector array 44B. The basic block diagram shown in FIG. 6 also applies here. A microcontroller 62 with built-in analog-to-digital converter 90 within the float digitizes the photodetector outputs and converts them into signals suitable for transmission by optical transmitter 68 or acoustic transmitter 66. These signals are received by optical receiver 70 or by acoustic receiver 72 in a modified version of rod support 10. Microcontroller 62 interprets and formats the received signals and sends distance or level data onward to display and communications devices.

FIG. 8 shows additional embodiment incorporating the sources 48C and photodetector arrays 44C so a code reader section 112 into modified rod support 114. Code reader section 112 functions in essentially the same way as the analogous parts within the floats. The primary difference is that the distance or level encoded on rod 12 needs only be read during encoding rod 12 installation or position change. Thus, the code reading process is manually activated.

Conclusions, Ramifications, and Scope

Accordingly, it can be seen that I have provided a liquid level measuring system that employs refractive distance or level encoding on a rodlike scale using microfacets. Microfacets allow for multi-symbol encoding, which reduces the number of encoder tracks required and/or increases the number of levels encoded. The rod-like scale also serves as a conduit for measurement data. I have also provided a method for recovering measurement data guided by the scale while simultaneously clamping the scale in place. A decoder in the rod clamp provides a reference level measurement.

Although the description above contains many specificities, these should not be construed as limiting the scope of the invention but as merely providing illustrations of some of the presently preferred embodiments of this invention. Various other embodiments and ramifications are possible within it's scope. For example, multi-symbol refractive encoding using microfacets can be used for other distance measurement applications besides liquid level sensing. Multi-symbol encoding using reflective microfacets is also feasible, and can be used for distance, height, or level measurement, and identification purposes. Refractive microfacets may be combined with reflection from surfaces to encode position or distance information and identification. An ordered sequence of refractive and reflective elements can be used for more complex encoding applications.

Thus the scope of the invention should be determined by the appended claims and their legal equivalents, rather than by the examples given.

I claim:
1. A method for measuring position along a ruler comprising, in combination,
   a. applying a measurement scale for encoding positional information along the length of said ruler comprising a sequence of area elements whereby each said area element divides an incident first beam of radiative energy into two or more second beams, where
      i. each of said second beams has a propagation direction substantially different from the propagation direction of any other said second beam and substantially different from the propagation direction of said incident first beam;
      ii. one or more said area elements correspond to a specific position along said ruler;
      iii. said propagation directions of all possible said second beams are predetermined; and
      iv. said area elements divide said first beam into a pattern of said second beams selectively in accordance with a code indicative of position along said ruler;
   b. emplacing an array of detectors so that the spatial locations of said detectors correspond to the spatial location of said possible second beams;
   c. detecting and decoding said detected patterns of second beams to recover said positional information.

2. The method of claim 1 wherein each said area element comprises one or more groupings of microfacets, where
   a. each of said groupings comprises at least one microfacet;
   b. the presence or absence of said groupings encodes positional information; and
   c. each said grouping of microfacets redirects all or part of radiative energy incident on said area element into substantially the same direction.

3. The method of claim 2 wherein said groupings of microfacets redirect said incident energy by means of refraction.

4. The method of claim 2 wherein said groupings of microfacets redirect said incident energy by means of reflection.

5. The method of claim 2 wherein of the microfacets comprising each of said groupings are not all contiguous.

6. The method of claim 2 wherein the microfacets comprising each of said groupings are continuous.

7. The method of claim 1 wherein said radiative energy is visible light.

8. The method of claim 1 wherein said radiative energy is infrared radiation.

9. An apparatus for measuring position along a ruler comprising, in combination,
- a. a measurement scale with encoding positional information along the length of said ruler comprised of a sequence of area elements whereby each said area element divides an incident first beam of radiative energy into two or ore second beams of radiative energy, where
  - i. each of said second beams has a propagation direction substantially different from the propagation direction of any other said second beam and substantially different from the propagation direction of said incident first beam;
  - ii. said propagation directions of all possible said second beams are predetermined; and
  - iii. said area elements divide said first beam into a pattern of said second beams selectively in accordance with a code indicative of position along said ruler;
- b. a moveable reader traveling along said ruler comprising:
  - i. one or more sources of radiative energy capable of producing and directing said first incident beams of radiative energy onto said area elements;
  - ii. an array of radiation detectors to indicate said second beams of radiative energy;
  - iii. means for displaying the outputs of radiation detectors as positional information.

10. The apparatus of claim 9 wherein each said area element comprises one or more groupings of microfacets, where
- a. each of said groupings comprises at least one microfacet;
- b. the presence or absence of said groupings encodes positional information; and
- c. each said grouping of microfacets redirects all or part of radiative energy incident an said area element into substantially the same direction.

11. The apparatus of claim 10 wherein said groupings of microfacets redirect said incident energy by means of refraction.

12. The apparatus of claim 10 wherein said groupings of microfacets redirect said incident energy by means of reflection.

13. The apparatus as recited in claim 9 wherein said ruler is a rod.

14. The apparatus of claim 9 wherein said radiative energy is visible light.

15. The apparatus of claim 9 wherein said radiative energy is infrared radiation.

* * * * *